(12) United States Patent
Grady

(10) Patent No.: US 6,763,785 B1
(45) Date of Patent: Jul. 20, 2004

(54) METHOD AND APPARATUS FOR SECURING A BANDANA

(76) Inventor: Arlene R. Grady, 280 Kirk La., Media, PA (US) 19063

( * ) Notice: Subject to any disclaimer, the term of this patent is extended or adjusted under 35 U.S.C. 154(b) by 0 days.

(21) Appl. No.: 10/354,626

(22) Filed: Jan. 30, 2003

(51) Int. Cl.$^7$ .............................................. A01K 27/00
(52) U.S. Cl. ...................................................... 119/858
(58) Field of Search ............................... 119/863, 856, 119/858, 855; 24/66.9, 115 H, 66.11, 129 B, 129 R; 2/207, 206, 244, 246, 171, 9, 468, 173, DIG. 11

(56) References Cited

U.S. PATENT DOCUMENTS

| | | | |
|---|---|---|---|
| 303,528 A | | 8/1884 | Lewis |
| 735,874 A | | 8/1903 | Herbert |
| 1,962,188 A | * | 6/1934 | Freeman ...................... 119/792 |
| 2,941,213 A | * | 6/1960 | Eliasberg ....................... 2/154 |
| 3,962,757 A | * | 6/1976 | Gedney ......................... 24/562 |
| 4,034,443 A | | 7/1977 | Turner .......................... 24/129 |
| 4,105,349 A | | 8/1978 | Kupperman et al. ......... 403/209 |
| 4,246,658 A | | 1/1981 | Liaw .............................. 2/152 |
| 4,760,624 A | * | 8/1988 | Fish ......................... 24/30.5 S |
| 5,363,809 A | * | 11/1994 | Roe ............................ 119/792 |
| 5,465,689 A | | 11/1995 | Winder ....................... 119/861 |
| 5,474,033 A | * | 12/1995 | Mitchell, Jr. ................ 119/860 |
| 5,655,272 A | * | 8/1997 | Young .......................... 24/482 |
| D423,150 S | * | 4/2000 | Vignere ..................... D30/145 |
| 6,209,140 B1 | * | 4/2001 | Ebeling ......................... 2/207 |
| 6,325,024 B1 | * | 12/2001 | Masukawa .................. 119/858 |
| D454,991 S | * | 3/2002 | Muller ...................... D30/152 |
| 6,523,182 B1 | * | 2/2003 | Brawner ........................ 2/207 |

* cited by examiner

*Primary Examiner*—Son T. Nguyen
(74) *Attorney, Agent, or Firm*—Mark A. Garzia, P.C.; Mark A. Garzia, Esquire

(57) ABSTRACT

A method and apparatus used in the method for securing at least two ends of a triangularly-shaped bandanna. The apparatus includes a generally flat article having three apertures there through. It is emphasized that this abstract is provided to comply with the rules requiring an abstract that will allow a searcher or other reader to quickly ascertain the subject matter of the technical diclosure. It is submitted with the understanding that it will not be used to interpret or limit the scope or meaning of the claims. 37 CFR 1.72(b).

11 Claims, 4 Drawing Sheets

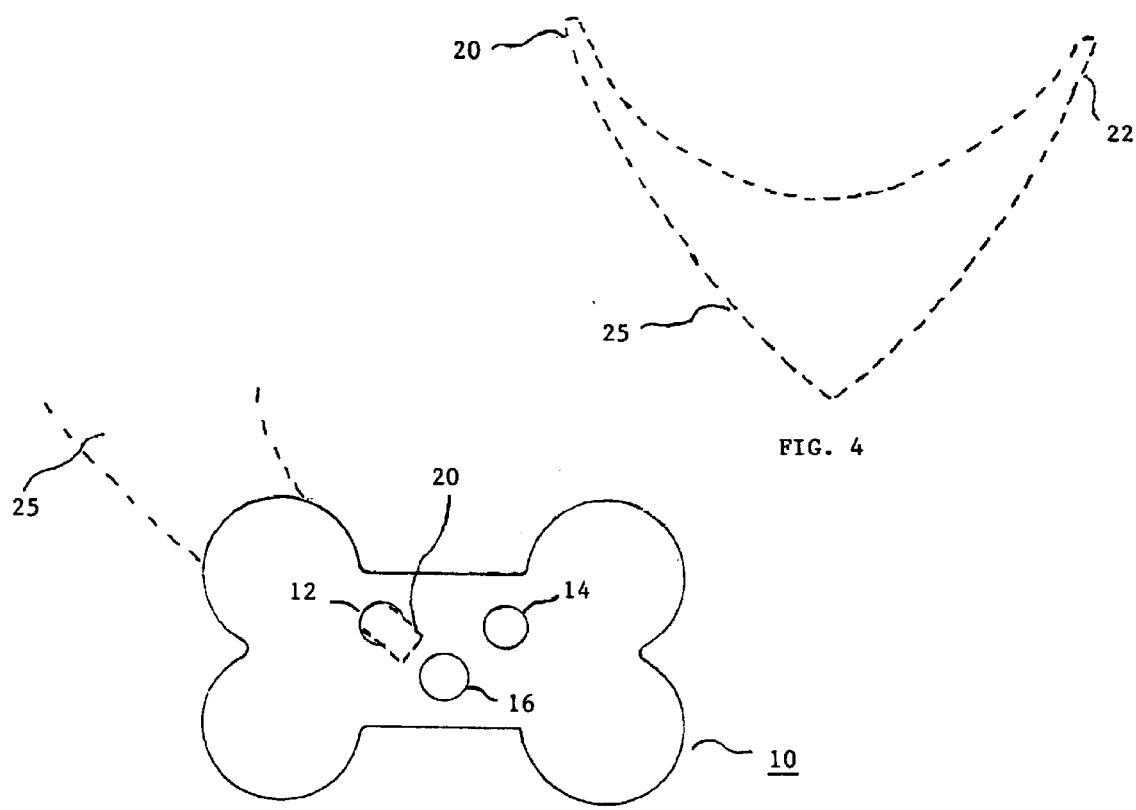
FIG. 4
FIG. 5
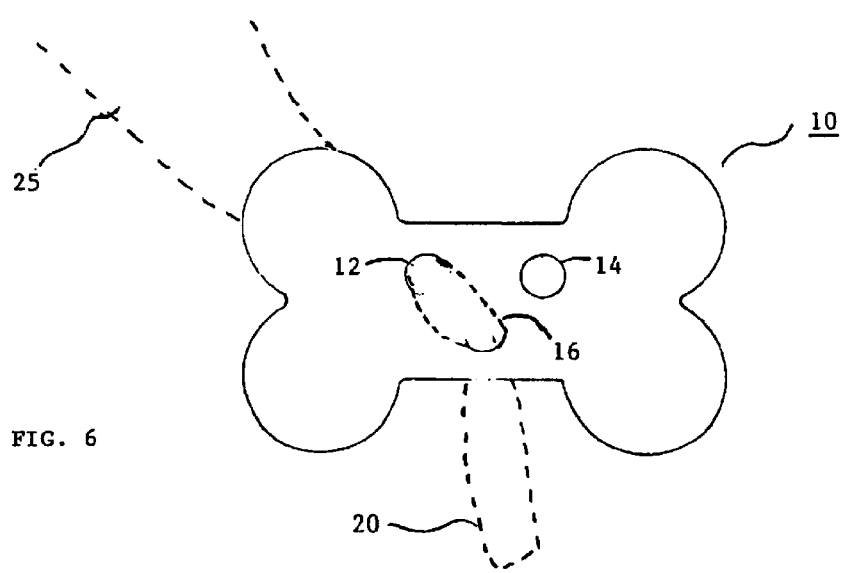
FIG. 6

METHOD AND APPARATUS FOR SECURING A BANDANA

FIELD OF THE INVENTION

This invention relates generally to pet bandannas and, more particularly, to a method and apparatus for tying a bandanna around the neck of a pet.

BACKGROUND OF THE INVENTION

It is well known to hang a piece of cloth around the neck of an animal and, in particular, the neck of a pet such as a dog, cat, potbelly pig, or rabbit as an accessory or a fashion statement. The cloth is usually triangular in shape and, besides being colorful, may include a design or picture. The cloth is usually referred to as bandanna or neckerchief.

Pet, and in particular canine, bandannas are well known. For example, U.S. Pat. No. DES 423,150 to Vignere discloses an ornamental design for a dog scarf. Retail outlets, for example, pet superstores, sell pet bandannas.

In some instances, the bandannas can be impregnated with a chemical insecticide or perfume to achieve a desired effect (i.e., as a flea and tick repellent and/or to cover the smell of a pet). For example, U.S. Pat. No. 5,465,689 to Winder discloses a flea and tick repellant bandanna for pets.

SUMMARY OF THE INVENTION

The present invention is a method and apparatus for quickly attaching a bandanna around the neck of a pet. The method involves the use of the apparatus. In addition, the apparatus may also complement the bandanna by manipulating the shape or appearance of the apparatus. For example, the apparatus can be shaped into a well-known object. In the drawings, the apparatus is shown as a bone (an item typically associated with dogs). However, this apparatus can be shaped into virtually any object (e.g., a pumpkin or bat if the bandanna has a Halloween theme associated with it). Further, the apparatus can be painted a particular color. For instance, the pumpkin can be painted orange to further complement and for keeping with a particular theme.

BRIEF DESCRIPTION OF THE DRAWINGS

The accompanying drawings, which are incorporated in and form a part of the specification, illustrate the embodiments of the present invention and, together with the following description, serve to explain the principles of the invention. For the purpose of illustrating the invention, embodiments which are presently preferred are shown in the drawings, it being understood, however, that the invention is not limited to the specific instrumentality or the precise arrangement of elements or process steps disclosed.

In the drawings:

FIG. 4 shows a pet scarf or bandanna which is designed to be tied around a pet's neck and illustrates the first step in a method of securing the bandanna about the pet's neck in accordance with the present invention;

FIG. 5 illustrates the second step of the method;

FIG. 6 illustrates the third step of the method;

DETAILED DESCRIPTION OF THE PREFERRED EMBODIMENT

In describing a preferred embodiment of the invention, specific terminology will be selected for the sake of clarity. However, the invention is not intended to be limited to the specific terms so selected, and it is to be understood that each specific term includes all technical equivalents that operate in a similar manner to accomplish a similar purpose.

Preferred embodiments of the present invention will now be described in detail with reference to the accompanying drawings in which an apparatus for securing the ends of a bandanna in accordance with the present invention is generally indicated at 10.

Figure 1:
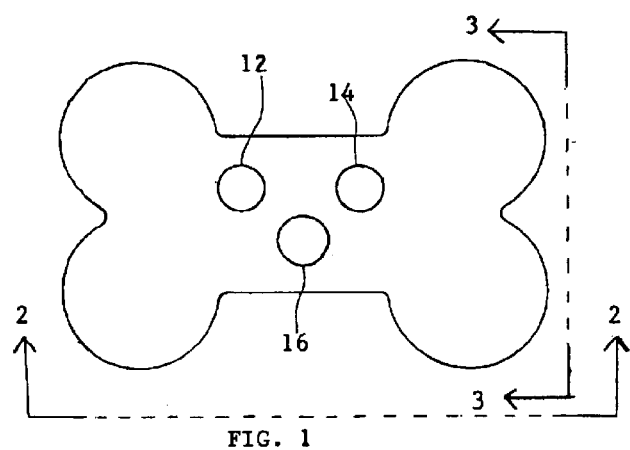
FIG. 1 is a top view of the apparatus in accordance with the present invention.

As illustrated in FIG. 1, an apparatus 10 for assisting in tying a bandanna 25 around the neck of a pet is illustrated. Although the apparatus may be scaled up or down in size to accommodate a particular sized bandanna (or pet), in a preferred embodiment, the apparatus 10 is approximately 3½" long to accommodate a large breed of dog and approximately 2¼ long to accommodate a small breed dog.

The apparatus 10 includes three apertures arranged substantially at the vertices of an inverted triangle. The apertures go completely through the apparatus. The aperture 12 at the upper left vertex and the aperture 14 at the upper right vertex are preferably slightly smaller in diameter than the bottom or lower aperture 16. In a preferred embodiment, the two upper apertures 12, 14 are 9/32 of an inch in diameter and the lower aperture 16 is 5/16 of an inch in diameter.

As illustrated, the apparatus 10 is shaped like a dog bone. However, it would be obvious to one skilled in the art, after reading the subject specification, that the general shape is not particularly important to the operation of the apparatus and is only meant to be pleasing to the eye of the pet's owner. The apparatus only needs to be large enough to have the three apertures positioned there through. As indicated previously, the apparatus 10 may be shaped like a geometric figure (e.g. a circle or square), pumpkin, a dog or other animal, or virtually any object. The shape of the apparatus is merely for aesthetics.

The three apertures are shown centered on the apparatus. It would be clear to a person skilled in the art, after reading this disclosure, to offset the three apertures to complement the shape or design of the apparatus.

In a preferred embodiment, the apparatus 10 is manufactured from plastic and preferably acrylic. This provides a number of options in the manufacturing and appearance of the apparatus. For example, the apparatus may be made of different colors during the manufacturing process by changing the color of the plastic or even painted, if desired. Further, plastics may be injection molded to lower the cost of manufacturing (i.e., the apertures will be pre-formed without drilling them out in a separate manufacturing step). However, the apparatus may be made from wood or metal (particularly a metal that does not oxidize and is relatively light in weight like aluminum).

Figure 2:
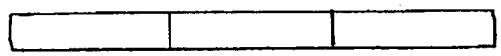
FIG. 2 is a front side view of the apparatus illustrated in FIG. 1 taken along lines 2—2.
Figure 3:
FIG. 3 is a right side view (from the perspective of the reader) of the apparatus illustrated in FIG. 1 taken along lines 3—3.
Figure 7:
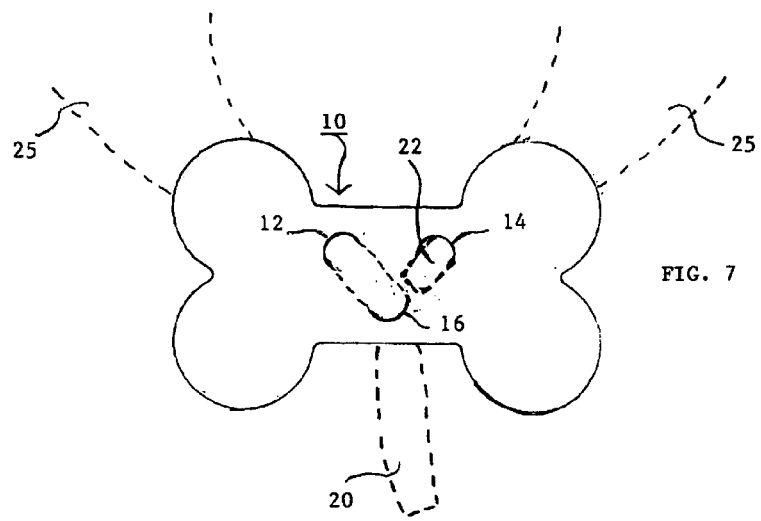
FIG. 7 illustrates the fourth step of the method.

FIG. 2 illustrates a front side view of the apparatus 10 illustrated in FIG. 1 taken along line 2—2, and FIG. 3 illustrates a right side view of the apparatus illustrated in FIG. 1 taken along line 3—3.

As illustrated, the apparatus 10 is relatively flat. This keeps the weight down and allows the ends to pass through the apertures with relative ease. In the dog bone embodiment, illustrated herein, the apparatus is approximately 3½ inches long, approximately 1 inch high and approximately ¼ inch thick.

Referring now to FIG. 4, a typical pet bandanna 25 is shown. Although the bandanna is illustrated as triangular in shape, it is commonly a square piece of cloth that is folded in half along a diagonal to generally form a triangle.

Depending on the size of the bandanna 25, the method according to the present invention may be initiated without placing the bandanna around the subject pet's neck. However, in most instances, the large portion of cloth (i.e., near the apex of the triangular shaped cloth) is placed on the back of the pet with first 20 end and the second 22 end of the cloth hanging down on the sides of the pet's neck.

Figure 8:
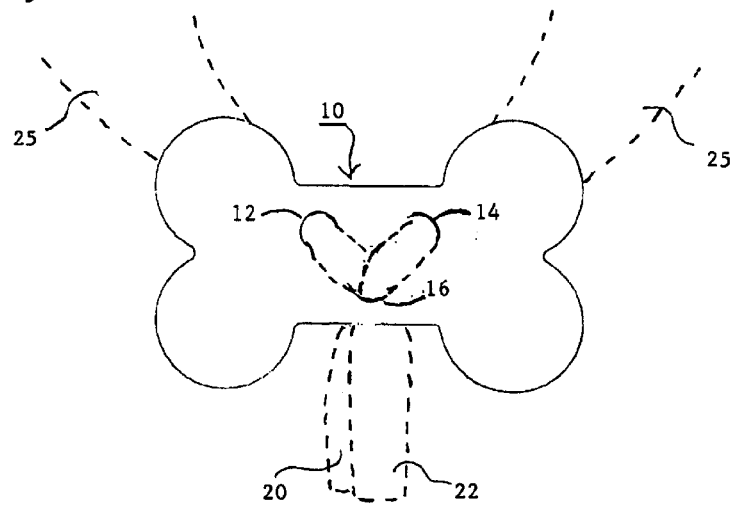
FIG. 8 illustrates the fifth step of the method.

The method is further illustrated in FIGS. 5–8. Although a pet is not shown, the bandanna is preferably hung around the neck of a pet with the left or first end 20 guided from the back of the apparatus 10 through upper left aperture 12. (The perspective when referring to the directions "left" and "right" is taken from the person practicing the invention.) The first end 20 may be pulled through aperture 12 from the front side and it is then guided back through bottom aperture 16. The right or second end 22 of the bandanna is guided from the back through upper right aperture 14 to the front of the apparatus 10. The second end 22 is then overlaid over first end 20 and through the bottom aperture 16 as shown in FIG. 8.

It is clear now why the lower aperture 16 is slightly larger than the upper apertures 12, 14 because it must secure both ends of the bandanna Moreover, the friction caused by the apertures holds the bandanna securely, thereby preventing it from falling off the pet.

The method may be practiced if the right end 22 of the bandanna 25 is drawn through the upper right aperture 14 first and then through bottom aperture 16, followed by guiding the left end 20 of the bandanna through its respective apertures.

Figure 9:
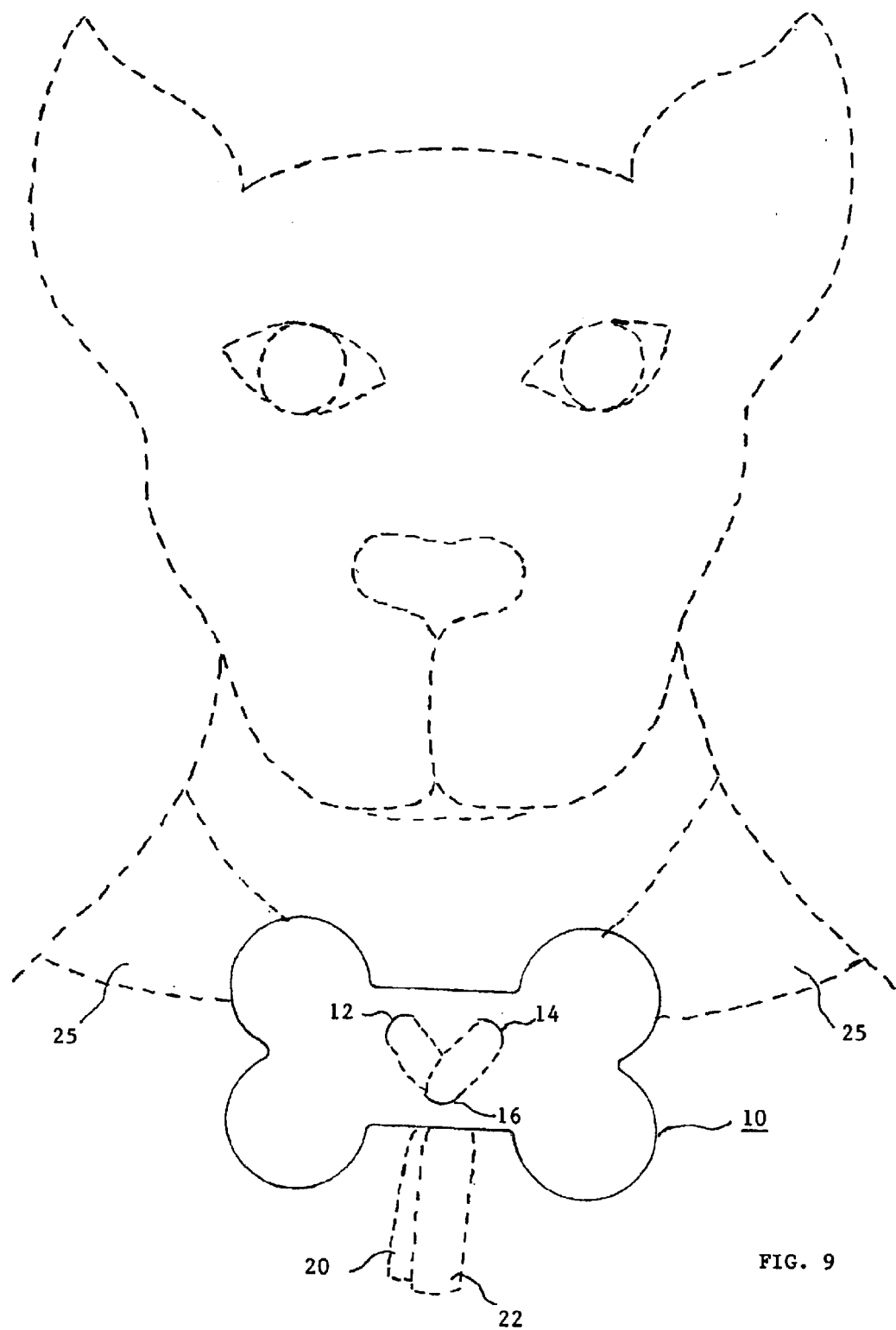
FIG. 9 is an isometric view of the bandanna as it hangs from the neck of a dog with the ends of the bandanna secured in accordance with the present invention.

The apparatus 10 may be adjusted by sliding the ends 20, 22 of the bandanna 25 through the apertures thereby making the bandanna looser or more snug around the neck of the pet as shown in FIG. 9.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

What is claimed is:

1. A method of securing the ends of a bandanna, comprising the steps of:
   providing a substantially triangular-shaped bandanna, the bandanna having first and second ends for manipulation and a third end near the apex of the triangle;
   providing an apparatus having three apertures therethrough, the apertures positioned at the vertices of an upside-down triangle said apertures being referred to as upper apertures and a bottom aperture, said apertures having diameters that allow the manual threading of said ends of the bandanna through the apertures but also providing sufficient friction to restrict movement of the bandanna when not being threaded;
   threading one end of said bandanna from the back of the apparatus through its respective upper aperture so that it appears at the front of the apparatus;
   threading said one end of said bandanna from the front of the apparatus through the bottom aperture;
   threading the other end of said bandanna from the back of the apparatus through the other upper aperture so that said other end appears at the front of the apparatus; and
   threading said other end of said bandanna from the front of the apparatus through the bottom aperture.

2. The method of claim 1 further comprising the step of slipping the bandanna about the head of a pet so that it hangs from the pet's neck.

3. The method of claim 2 further comprising the step of pulling the left and right ends of said bandanna to slide the apparatus with respect to the ends of the bandanna thereby adjusting the snugness of the bandanna around the pet's neck.

4. A method of dressing up a pet in a bandanna, comprising the steps of:
   providing a substantially triangular-shaped bandanna, the bandanna having first and second ends for manipulation and a third end near the apex of the triangle;
   placing the third end of the bandanna on the back and neck of a pet so that said first and second ends hang down the side of the pet's neck;
   providing an apparatus having three apertures therethrough, the apertures positioned at the vertices of an upside-down triangle, said apertures having a diameter that allows the ends of the bandanna to be threaded through but provides sufficient friction to prevent the ends from un-threading;
   threading the first end of said bandanna from the back of the apparatus through its respective upper aperture so that the first end of said bandanna appears at the front of the apparatus;
   threading said first end of said bandanna from the front of the apparatus through the bottom aperture;
   threading the second end of said bandanna from the back of the apparatus through the other upper aperture so that said second end appears at the front of the apparatus; and
   threading said second end of said bandanna from the front of the apparatus through the bottom aperture.

5. The method of claim 4 wherein the two upper apertures are slightly smaller in diameter than the bottom aperture.

6. The method of claim 4 wherein the bandanna has a pattern printed thereon and the apparatus is shaped to complement the theme of said printed pattern.

7. The method of claim 6 wherein the apparatus is shaped substantially to resemble a bone.

8. The method of claim 4 wherein the apparatus is made of plastic.

9. The method of claim 4 wherein the apparatus is made of metal.

10. The method of claim 4 wherein the apparatus is made of wood.

11. The method of claim 4 further comprising the step of pulling the left and right ends of said bandanna to slide the apparatus with respect to the ends of the bandanna thereby adjusting the snugness of the bandanna around the pet's neck.

* * * * *